United States Patent
Chatani et al.

(10) Patent No.: US 11,624,185 B2
(45) Date of Patent: Apr. 11, 2023

(54) PENETRATION PART FIREPROOF COATING MATERIAL

(71) Applicant: YOSHINO GYPSUM CO., LTD., Tokyo (JP)

(72) Inventors: Yukiko Chatani, Chiyoda-ku (JP); Mariko Seki, Chiyoda-ku (JP); Takahiro Hebiishi, Chiyoda-ku (JP); Eiichi Kuroda, Chiyoda-ku (JP); Wataru Ohuchi, Chiyoda-ku (JP); Takuji Yamashita, Chiyoda-ku (JP); Kouji Yamakata, Chiyoda-ku (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 534 days.

(21) Appl. No.: 16/771,507

(22) PCT Filed: Dec. 20, 2018

(86) PCT No.: PCT/JP2018/047033
§ 371 (c)(1),
(2) Date: Jun. 10, 2020

(87) PCT Pub. No.: WO2019/124504
PCT Pub. Date: Jun. 27, 2019

(65) Prior Publication Data
US 2020/0299956 A1    Sep. 24, 2020

(30) Foreign Application Priority Data
Dec. 21, 2017    (JP) .............................. JP2017-245527

(51) Int. Cl.
*E04B 1/94*    (2006.01)
*C04B 11/00*    (2006.01)
(Continued)

(52) U.S. Cl.
CPC ................ *E04B 1/947* (2013.01); *B32B 1/08* (2013.01); *B32B 13/04* (2013.01); *C04B 11/00* (2013.01);
(Continued)

(58) Field of Classification Search
CPC . E04B 1/945; E04B 1/947; F16L 5/04; C04B 11/00; C04B 2111/0062;
(Continued)

(56) References Cited

U.S. PATENT DOCUMENTS

| 4,109,423 A | 8/1978 | Perrain |
| 4,219,173 A | 8/1980 | Forbes |

(Continued)

FOREIGN PATENT DOCUMENTS

| CN | 1338585 A | 3/2002 |
| CN | 1349600 A | 5/2002 |

(Continued)

OTHER PUBLICATIONS

International Search Report dated Feb. 5, 2019 for International Patent Application No. PCT/JP2018/047033, 2 pages.

*Primary Examiner* — Yan Lan
(74) *Attorney, Agent, or Firm* — Staas & Halsey LLP

(57) ABSTRACT

A penetration part fireproof covering material used when a penetration part covered for fireproof is formed in a fireproof beam that is a fireproof constructional member that constitutes a wooden building, wherein the penetration part fireproof covering material is formed to have a tubular shape by stacking a plurality of gypsum board pieces (13a) formed from gypsum boards in a thickness direction and unitarily connecting the plurality of gypsum board pieces. The penetration part fireproof covering material is formed to have the tubular shape by stacking the plurality of gypsum board pieces that preferably have an annular shape and are cut out (Continued)

from commercially available gypsum boards having thicknesses of 9.5 mm to 25.5 mm while fixing the plurality of gypsum board pieces to each other preferably using metal fasteners such as staples, and unitarily connecting the plurality of gypsum board pieces.

18 Claims, 4 Drawing Sheets

(51) Int. Cl.
*F16L 5/04* (2006.01)
*B32B 1/08* (2006.01)
*B32B 13/04* (2006.01)
*C04B 111/00* (2006.01)
*C04B 111/28* (2006.01)

(52) U.S. Cl.
CPC ......... *F16L 5/04* (2013.01); *B32B 2307/3065* (2013.01); *C04B 2111/0062* (2013.01); *C04B 2111/00698* (2013.01); *C04B 2111/28* (2013.01)

(58) Field of Classification Search
CPC ....... C04B 2111/00698; C04B 2111/28; B32B 1/08; B32B 13/04; B32B 13/08; B32B 2250/42; B32B 2307/3065; B32B 2419/00; B32B 29/002; B32B 3/18; B32B 7/08
See application file for complete search history.

(56) References Cited

U.S. PATENT DOCUMENTS

| | | | |
|---|---|---|---|
| 4,736,566 A * | 4/1988 | Krotsch | ................ E04C 2/384 |
| | | | 52/798.1 |
| 5,174,077 A | 12/1992 | Murota | |
| 6,410,122 B1 | 6/2002 | Tono et al. | |
| 6,725,615 B1 | 4/2004 | Porter | |
| 8,734,582 B2 * | 5/2014 | Yamashita | ............... C09D 1/08 |
| | | | 106/781 |
| 2002/0056242 A1 | 5/2002 | Andresen | |
| 2011/0018206 A1 | 1/2011 | Beele | |
| 2013/0278016 A1 | 10/2013 | Kia et al. | |

FOREIGN PATENT DOCUMENTS

| | | |
|---|---|---|
| CN | 201391684 Y | 1/2010 |
| CN | 101802472 A | 8/2010 |
| CN | 102245950 A | 11/2011 |
| CN | 103375677 A | 10/2013 |
| CN | 104153475 A | 11/2014 |
| CN | 204828966 U | 12/2015 |
| CN | 204828967 U | 12/2015 |
| CN | 205134742 U | 4/2016 |
| CN | 105863092 A | 8/2016 |
| CN | 107476447 A | 12/2017 |
| EP | 0 164 416 A1 | 12/1985 |
| EP | 2 087 925 A3 | 9/2009 |
| EP | 2 339 708 A2 | 6/2011 |
| JP | 7-127766 | 5/1995 |
| JP | 3817532 | 6/2006 |
| JP | 4533006 | 8/2010 |
| JP | 2016-65431 | 4/2016 |
| JP | 2016-186164 | 10/2016 |
| JP | 2017-75458 | 4/2017 |
| RU | 2 705 620 C1 | 11/2019 |

* cited by examiner

PENETRATION PART FIREPROOF COATING MATERIAL

CROSS-REFERENCE TO RELATED APPLICATIONS

This application is a U.S. National Stage Application which claims the benefit under 35 U.S.C. § 371 of International Patent Application No. PCT/JP2018/047033 filed on Dec. 20, 2018, which claims foreign priority benefit under 35 U.S.C. § 119 of Japanese Patent Application No. 2017-245527 filed on Dec. 21, 2017 in the Japanese Intellectual Property Office, the contents of both of which are incorporated herein by reference.

TECHNICAL FIELD

The present invention relates to a penetration part fireproof covering material, and particularly to a fireproof covering material used when a penetration part covered for fireproof is formed in a wooden building.

BACKGROUND ART

In a wooden building, fire prevention sections are preferably provided in order to, if a fire occurs within the wooden building, contain the fire to a limited area and prevent the fire from spreading to other sections. The fire prevention sections are sections that are formed by dividing the building into sections using floors, walls, ceilings, fire prevention doors, and the like of a fireproof structure, each section being surrounded by a floor, a wall, a ceiling, a wall member such as a fire prevention door, and the like (hereinafter referred to as "fire prevention section forming members") of the fireproof structure provided around the section. In the fire prevention section forming members around the section, there are cases where penetration parts through which a pipe, a wire, or the like is to be passed need to be provided, and a structure for forming a penetration part in a fire prevention section forming member as shown in, for example, FIGS. 6(a) and 6(b) is widely used.

In the structure for forming a penetration part in a fire prevention section forming member shown in FIGS. 6(a) and 6(b), a wooden frame 50 is assembled and fitted in advance to a wall or floor at a position at which a penetration part needs to be formed, and the inner circumference of the wooden frame 50 is covered with fireproof covering materials 51 such as gypsum boards, and at the same time, fireproof covering materials 52 such as gypsum boards are attached to the surface of the wall or floor around the penetration part. Then, a tubular member 53 made of vinyl chloride, steel, or the like is passed through the wooden frame 50 preferably in a state of being supported by a support member 54. A penetration part formed by the tubular member 53 is thereby formed.

Also, for example, in Japanese wooden buildings, a design where the wood surface of wooden beams and posts, which are constructional members, is exposed to the interior of a room, such as that of a traditional "shinkabe-zukuri" structure in which wooden beams and posts are exposed, is a popular design. The design in which the wood surface of wooden beams and posts is exposed to the interior of a room can be made to have desired fireproof by using a burning margin design. However, in the case where a penetration part is formed in a beam or post with a burning margin design as described above, fireproof may be lost at the penetration part, allowing fire to spread to the surroundings from the penetration part, and affecting the supporting force of a load supporting layer included in the beam or post with a burning margin design. For this reason, a fireproof wooden constructional member that prevents fire from spreading to the surroundings from a penetration part has been proposed (see, for example, Patent Literature 1).

In the wooden constructional member disclosed in Patent Literature 1, a tubular member made of, for example, mortar acting as a firestop portion is passed through a penetration part extending through a beam so as to cover the inner circumferential surface of the penetration part, and a gap between the inner circumferential surface of the penetration part and the outer circumferential surface of the tubular member is filled with a filling material made of a fireproof material such as mortar. Patent Literature 1 also discloses that, other than mortar, gypsum, calcium silicate, or the like can be used as a large heat capacity material that can be used to form a firestop and can absorb heat.

CITATION LIST

Patent Literature

Patent Literature 1: JP 6014320B

SUMMARY OF INVENTION

Problems to be Solved by the Invention

However, in the conventional penetration part fireproof covering material that prevents fire from spreading to the surroundings from a penetration part, the tubular member provided in the penetration part is formed by casting, for example, a firestop material such as mortar, gypsum, or calcium silicate into a tubular mold, and then curing the firestop material. For this reason, sufficient dimensional accuracy cannot be obtained, and particularly when a penetration part that extends through a fireproof constructional member of a wooden building is covered for fireproof, it may be difficult to snugly fit the tubular member into the penetration part.

In addition, a tubular molding mold that conforms to the shape of a penetration part needs to be formed each time, which increases the production cost.

It is an object of the present invention to provide a penetration part fireproof covering material, wherein a fireproof covering material that is provided in a penetration part in a wooden building and functions as a firestop layer can be formed highly accurately and economically, and the penetration part can be covered for fireproof easily and at low cost.

The present invention achieves the above-described object by providing a penetration part fireproof covering material used when a penetration part covered for fireproof is formed in a wooden building, wherein the fireproof covering material is formed to have a tubular shape by stacking a plurality of gypsum board pieces in a thickness direction and unitarily connecting the plurality of gypsum board pieces.

In the penetration part fireproof covering material according to the present invention, it is preferable that the plurality of gypsum board pieces are annular gypsum board pieces.

Also, in the penetration part fireproof covering material according to the present invention, it is preferable that the plurality of gypsum board pieces are cut out from gypsum boards of thicknesses of 9.5 mm to 25.5 mm.

Furthermore, in the penetration part fireproof covering material according to the present invention, it is preferable that the plurality of gypsum board pieces are stacked and unitarily connected in such a manner that sheets of paper are attached to both sides of each gypsum board piece.

Furthermore, in the penetration part fireproof covering material according to the present invention, it is preferable that the plurality of gypsum board pieces are stacked and unitarily connected to form the tubular shape by being fixed to each other using metal fasteners.

Also, in the penetration part fireproof covering material according to the present invention, it is preferable that the plurality of gypsum board pieces are ring-shaped gypsum board pieces and are stacked and unitarily connected to form a cylindrical shape.

DESCRIPTION OF EMBODIMENTS

Figure 1:
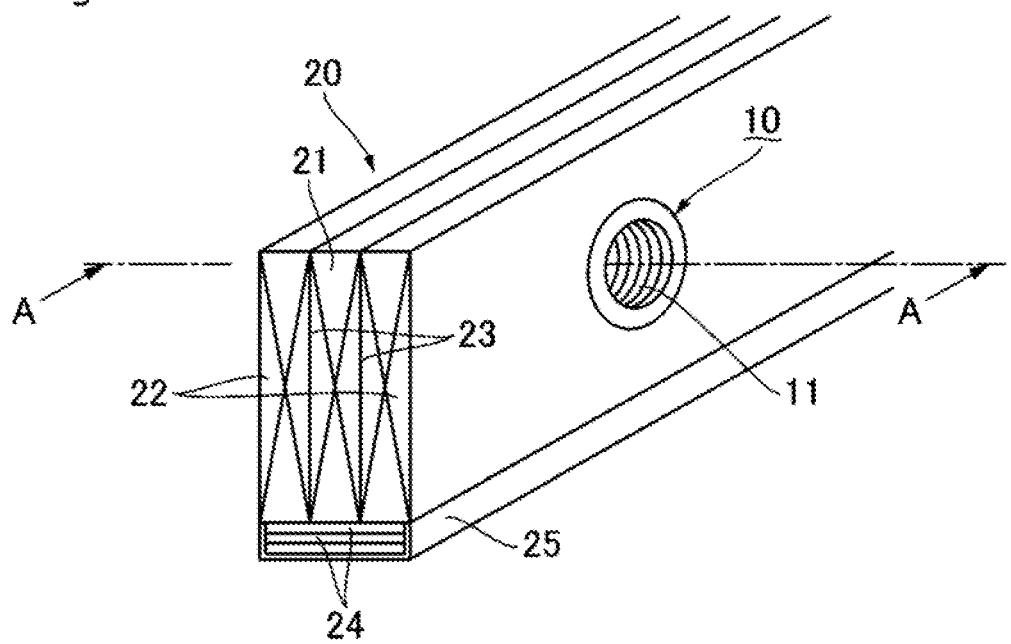
FIG. 1 is a schematic perspective view of a fireproof beam that is a fireproof constructional member and has a penetration part covered for fireproof by a penetration part fireproof covering material according to a preferred embodiment of the present invention.
Figure 2:
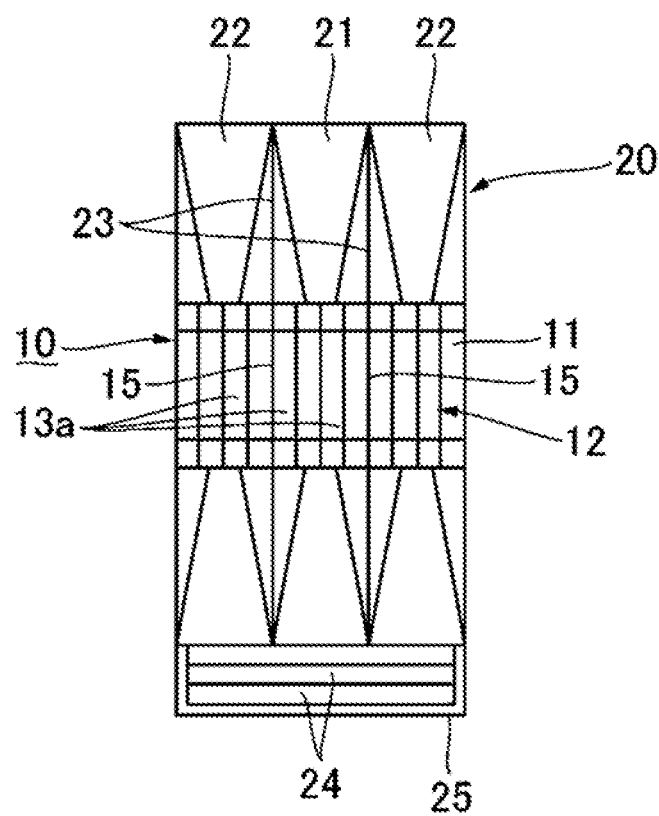
FIG. 2 is a cross sectional view taken along the line A-A shown in FIG. 1.

As shown in FIGS. 1 and 2, a penetration part fireproof covering material 10 according to a preferred embodiment of the present invention is used, for example, when forming a penetration part 11 through which a pipe or a wire is to be passed in a fireproof beam 20 that is a fireproof constructional member that constitutes a wooden building, to cover the inner circumferential surface of the penetration part 11 to make it fireproof, so as to effectively avoid a situation in which the fireproof of the fireproof beam 20 is lost at the penetration part 11, affecting the supporting force of a load supporting layer included in the fireproof beam 20. The penetration part fireproof covering material 10 according to the present embodiment can be formed easily, accurately, and economically by preferably using commercially available gypsum boards, and has a function of covering a penetration part 11 to make it fireproof easily and at low cost.

Figure 3A:
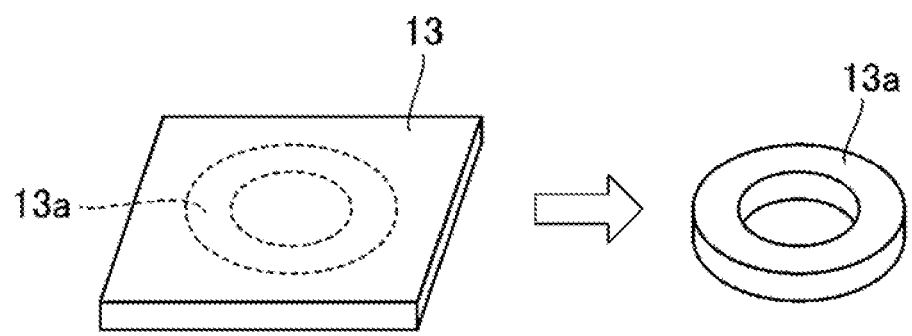
FIGS. 3(a) and 3(b) are schematic perspective views illustrating the step of forming a penetration part fireproof covering material.
Figure 3B:
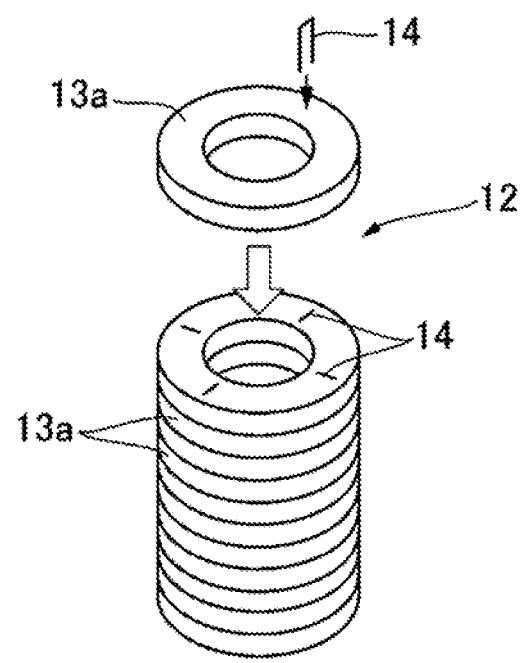

Also, the penetration part fireproof covering material 10 according to the present embodiment is, for example, as shown in FIGS. 1 and 2, a fireproof covering material used when forming a penetration part 11 covered for fireproof in a fireproof beam 20 that is a fireproof constructional member that constitutes a wooden building. As shown in FIGS. 3(a) and 3(b), the fireproof covering material 10 is formed to have a tubular shape by stacking a plurality of gypsum board pieces 13a, which are preferably annular gypsum board pieces, in a thickness direction and unitarily connecting the plurality of gypsum board pieces 13a.

Also, in the present embodiment, the plurality of annular gypsum board pieces 13a are preferably ring-shaped gypsum board pieces that are cut out from commercially available gypsum boards 13 of thicknesses of 9.5 mm to 25.5 mm. The plurality of ring-shaped annular gypsum board pieces 13a are stacked and unitarily connected to form a cylindrical penetration part fireproof covering material 10 by being fixed to each other using metal fasteners, preferably, staples 14 (see FIG. 3(b)).

In the present embodiment, as shown in FIGS. 1 and 2, the fireproof beam 20 includes: a structural member 21 that serves as a load supporting layer; and a pair of covering members 22 that are disposed on two side faces of the structural member 21 to cover the side faces and function as burning margin layers or firestop layers. The penetration part 11 is opened preferably to perpendicularly or substantially perpendicularly intersect two boundary portions 23 between the structural member 21 and the covering members 22. The penetration part fireproof covering material 10 in which the annular gypsum board pieces 13a are stacked is attached by being inserted through the penetration part 11 such that a connecting portion 15 that connects annular gypsum board pieces 13a that are adjacent in the stacking direction is disposed at each of the two boundary portions 23 between the structural member 21 and the covering members 22 of the fireproof beam 20, or at each portion close to the boundary portions 23. Here, the covering members 22 function not only as burning margin layers, but also as firestop layers. The structural member 21 covered by the wooden covering members 22 that function as burning margin layers can be deemed as a structural member 21 covered by the wooden firestop covering members 22.

Also, in the present embodiment, the fireproof beam 20 is preferably a fireproof beam that is designed to have a burning margin and has fireproof performance corresponding to a 45 minute quasi-fireproof structure or more. That is, the fireproof beam 20 includes: a structural member 21 that has, for example, an elongated rectangular cross sectional shape with a height of about 560 mm and a width of about 105 mm and functions as a structural beam material; a pair of covering members 22 that are disposed to cover the side faces of the structural beam material 21, have, for example, an elongated rectangular cross sectional shape with a height of about 560 mm and a width of about 105 mm as with the structural member 21, and function as additional beam materials for a burning margin; and a fireproof covering material 24 that is attached to continuously cover the lower surface of the structural member 21 and the lower surfaces of the covering members 22 that are disposed on two sides. The fireproof covering material 24 has a function of protecting the wooden material covered by the fireproof covering material 24 from being burnt and damaged for 45 minutes or more in case of a fire and a function of protecting the same from being thermally degraded, and has a three-layer structure composed of, for example, gypsum boards or the like. Also, a decorative wooden board 25 is attached to cover the outer circumferential surface of the fireproof covering material 24, excluding the surface covering the structural member 21 and the covering members 22.

Here, the structural member 21 and the pair of covering members 22 that constitute the fireproof beam 20 may be unitarily connected using an adhesive, nails, screws, or the like. However, in the present embodiment, the structural member 21 and the pair of covering members 22 are preferably formed as a unitary body without being connected. Accordingly, in the structural member 21 and the pair of covering members 22, a height difference is likely to be generated at each boundary portion 23 on the inner circumferential surface of the penetration part 11 opened to intersect the boundary portion 23 due to differences in behavior caused when the structural member 21 and the covering members 22 dry and contract and when they support a load. In the present embodiment, the fireproof penetration part covering material 10 is formed by stacking and unitarily connecting a plurality of annular gypsum board pieces 13a fixed preferably using staples 14 as metal fasteners, and thus, as will be described later, the influence of height differences generated at the boundary portions 23 can be absorbed by the connecting portions 15.

In the present embodiment, the penetration part fireproof covering material 10 that is attached by being inserted through the penetration part 11 of the fireproof beam 20 is formed to have a cylindrical shape by stacking a plurality of ring-shaped annular gypsum board pieces 13a in the thickness direction, the gypsum board pieces 13a being preferably formed from gypsum boards 13 of thicknesses of 9.5 mm to 25.5 mm as shown in FIGS. 3(a) and 3(b), and unitarily connecting the plurality of ring-shaped annular gypsum board pieces 13a. The gypsum boards 13 are pieces of construction material obtained by wrapping a plate-shaped material composed mainly of gypsum with gypsum board base paper, and are known as pieces of material that have high thermal insulation and sound insulation. As the gypsum boards 13, any commercially available gypsum boards that are on the market as inexpensive plate-shaped members and are easily obtainable can be used. As the gypsum boards 13, "gypsum boards" "reinforced gypsum boards", "regular hard gypsum boards", or the like with thicknesses of 9.5 mm, 12.5 mm, 15 mm, 16 mm, 18 mm, 21 mm, and 25 mm specified by JIS A 6901-2014 may be used. In the case where the gypsum boards 13 have the same thickness, it is preferable to use reinforced gypsum boards that are highly fireproof as the gypsum boards 13. According to JIS A 6901-2014, the tolerance of the thickness of a gypsum board is 0 mm to 0.5 mm. For example, for a 25 mm-thick gypsum board, a gypsum board having a thickness of 25 mm to 25.5 mm is allowed. Furthermore, a gypsum board 13 can be accurately and easily cut out to have a desired shape using, for example, a known cutting tool such as a router.

In the present embodiment, the plurality of annular gypsum board pieces 13a are formed by, for example, cutting commercially available gypsum boards 13 into, for example, a ring-shaped (doughnut shaped) planar shape with, for example, an inner diameter of about 115 mm and an outer diameter of about 195 mm, using a router. A cylindrical penetration part fireproof covering material 10 is formed by stacking a plurality of (in the present embodiment, twelve) cut-out ring-shaped annular gypsum board pieces 13a in the thickness direction and unitarily connecting them, preferably in such a manner that sheets of gypsum board base paper (not shown) are attached to two sides of each gypsum board piece 13a.

Here, as a result of the annular gypsum board pieces 13a being stacked in such a manner that sheets of gypsum board base paper (not shown) are attached to two sides of each gypsum board piece 13a, the two sides of each annular gypsum board piece 13a are smooth, and the stacking surfaces of the annular gypsum board pieces 13a are smooth, and thus the annular gypsum board pieces 13a can be bonded without a gap. Also, as a result of the annular gypsum board pieces 13a being bonded without a gap using staples or the like, even when the annular gypsum board pieces 13a are stacked with the paper being attached thereto, the fireproof of a tubular fireproof covering material 12 can be ensured. The annular gypsum board pieces 13a may be stacked without the paper being attached to two sides of each gypsum board piece 13a, and unitarily connected.

The plurality of annular gypsum board pieces 13a can be stacked and unitarily connected using a known adhesive, but in the present embodiment, as described above, the plurality of annular gypsum board pieces 13a are stacked and unitarily connected preferably by being fixed to each other using staples 14 (see FIG. 3(b)) as metal fasteners. The staples are wire members that are bent into a squared U shape and known as metal fasteners for fixing gypsum boards. By punching staples through a gypsum board using a tacker (staple gun) that is a tool known as a construction stapler, a gypsum board can be easily fixed to another gypsum board, a support member, and the like. If one staple 14 is passed through, for example, two gypsum boards or more at a time, the gypsum boards may break. Accordingly, in the present embodiment, the staples 14 have a leg length that is about 1.5 to 2 times longer than the thickness of a gypsum board, and are preferably sequentially punched through every two adjacent annular gypsum board pieces 13a of the stacked gypsum board pieces 13a so as to fix twelve annular gypsum board pieces 13a to each other and unitarily connect the gypsum board pieces 13a. Also, in the cylindrical penetration part fireproof covering material 10 formed by unitarily connecting twelve ring-shaped annular gypsum board pieces 13a, it is preferable to apply an adhesive such as, for example, an inorganic adhesive Tora Bond (registered trademark, available from Yoshino Gypsum Co., Ltd.) to the outer circumferential surface of the connecting portions 15 of adjacent annular gypsum board pieces 13a so as to increase connection strength and fireproof.

As the metal fasteners 14 for fixing the plurality of gypsum board pieces 13a to each other, in addition to the staples 14, various types of known metal fittings can be used as metal fasteners such as nails, pins, and screws, for example.

In the present embodiment, the cylindrical penetration part fireproof covering material 10 formed by unitarily connecting twelve ring-shaped annular gypsum board pieces 13a has, for example, a length of about 300 to 310 mm, which is slightly shorter than the length (315 mm) of the penetration part 11 formed passing through the fireproof beam 20, and also has, for example, an outer diameter of 195 mm, which is slightly smaller than the inner diameter (200 mm) of the penetration part 11.

Here, the penetration part fireproof covering material 10 is formed by stacking a plurality of annular gypsum board pieces 13a that are cut out from commercially available gypsum boards 13 of thicknesses of, for example, 9.5 mm, 12.5 mm, 15 mm, 16 mm, 18 mm, 21 mm, and 25 mm, and it is therefore possible to easily adjust the length of the fireproof penetration part covering material 10 to a desired length by selecting gypsum boards 13, from which annular gypsum board pieces 13a are cut out, among a plurality of gypsum boards 13 having different thicknesses as appropriate, changing the combination of a plurality of cut-out annular gypsum board pieces 13a having different thicknesses, and stacking the gypsum board pieces 13a. Also, by selecting gypsum boards 13, from which annular gypsum board pieces 13a are cut out, among a plurality of gypsum boards 13 having different thicknesses as appropriate, changing the combination of a plurality of cut-out annular gypsum board pieces 13a having different thicknesses, and stacking the gypsum board pieces 13a, the positions of the connecting portions 15 in the penetration part fireproof covering material 10 can be adjusted as appropriate such that, in a state in which the penetration part fireproof covering material 10 is inserted into the penetration part 11 of the fireproof beam 20, two connecting portions 15 out of the connecting portions 15 of all of the adjacent annular gypsum board pieces 13a are disposed at two boundary portions 23 between the structural member 21 and the covering members 22 of the fireproof beam 20, or at portions close to the boundary portions 23.

Figure 4A:
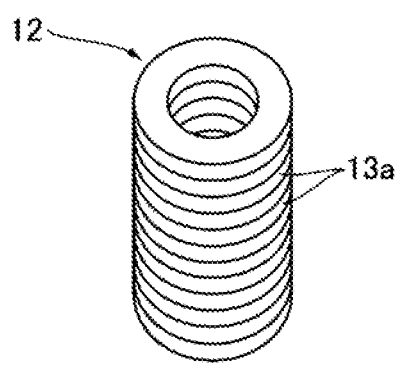
FIGS. 4(a) to 4(d) are schematic perspective views illustrating exemplary embodiments of the penetration part fireproof covering material.
Figure 4B:
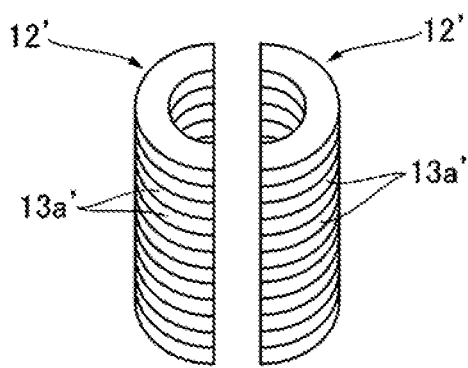

The annular gypsum board pieces 13a that form the penetration part fireproof covering material 10 are not necessarily cut out to have a ring-shaped planar shape from commercially available gypsum boards 13 and stacked as shown in FIG. 4(a). As shown in FIG. 4(b), for example, a tubular penetration part fireproof covering material 10 in which a plurality of annular gypsum board pieces 13a obtained from gypsum boards 13 are stacked in the thickness direction and unitarily connected (see FIG. 4(a)) may be obtained by stacking gypsum board pieces 13a' that are cut out to have a halved ring shaped planar shape so as to form a divided fireproof covering material 12', and unitarily connecting a plurality of such divided fireproof covering materials 12' in the circumferential direction. As shown in FIG. 4(c), for example, the tubular penetration part fireproof covering material 10 in which a plurality of annular gypsum board pieces 13a obtained from gypsum boards 13 are stacked in the thickness direction and unitarily connected (see FIG. 4(a)) may also be obtained by stacking gypsum board pieces 13a" that are cut out to have a trisected ring shaped planar shape so as to form a divided fireproof covering material 12", and unitarily connecting a plurality of such divided fireproof covering materials 12" in the circumferential direction.

Figure 4D:
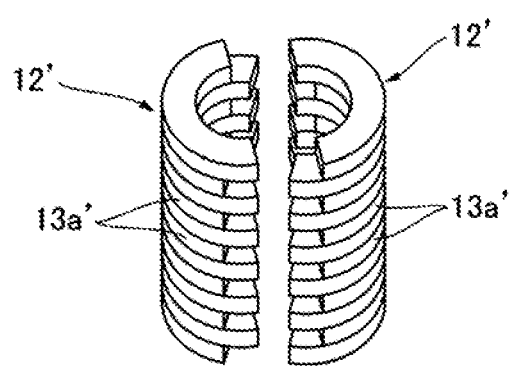
Figure 4C:
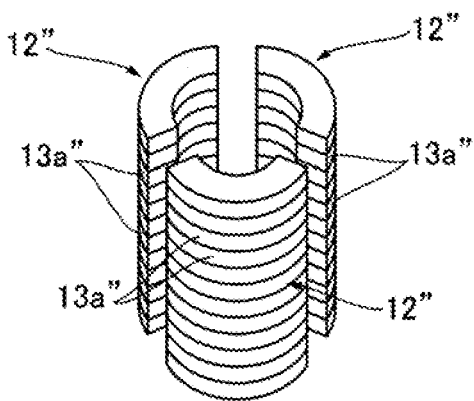

Alternatively, as shown in FIG. 4(d), for example, the tubular penetration part fireproof covering material 10 in which a plurality of annular gypsum board pieces 13a obtained from gypsum boards 13 are stacked in the thickness direction and unitarily connected (see FIG. 4(a)) may also be obtained by stacking a plurality of gypsum board pieces 13a' that are cut out to have a halved ring shaped planar shape such that vertically adjacent gypsum board pieces 13a' are circumferentially staggered to form a plurality of divided fireproof covering materials 12', and unitarily connecting the divided fireproof covering materials 12' in the circumferential direction.

In the present embodiment, the penetration part fireproof covering material 10 formed by unitarily connecting a plurality of annular gypsum board pieces 13a in the manner described above is attached by being inserted into the penetration part 11 formed in the fireproof beam 20 so as to cover the inner circumferential surface of the penetration part 11, and the penetration part 11 is thereby covered for fireproof. That is, as shown in FIGS. 1 and 2, the penetration part fireproof covering material 10 formed in the manner described above is inserted into the penetration part 11 formed to extend through the fireproof beam 20 and has a hollow circular cross section with an inner diameter of, for example, about 200 mm preferably such that the fourth and eighth connecting portions 15 out of eleven connecting portions 15 of adjacent annular gypsum board pieces 13a are disposed at two boundary portions 23 between the structural member 21 and the covering members 22 of the fireproof beam 20, or at portions close to the boundary portions 23. Also, the penetration part fireproof covering material 10 is fixed to the penetration part 11 by filling a gap between the outer circumferential surface of the inserted penetration part fireproof covering material 10 and the inner circumferential surface of the penetration part 11 with, for example, a fireproof putty or the like and solidifying the putty. After that, the end faces are finished by preferably filling a gap at each end face of the penetration part fireproof covering material 10 fixed to the penetration part 11 with a fireproof putty or the like.

In the present embodiment, a known floor member (not shown) that has predetermined fireproof performance is attached to the upper surface portion of the fireproof beam 20 so as to cover the upper surface of the fireproof beam 20, and thus the structural member 21 is not affected by heat from the upper surface side in case of a fire. Accordingly, even when a fireproof covering material is not provided on the upper surface portion of the fireproof beam 20, it is possible to effectively avoid a situation in which the structural member 21 is burnt and damaged or thermally degraded.

Also, with the penetration part fireproof covering material 10 according to the present embodiment configured as described above, it is possible to accurately and economically form a fireproof covering material that is installed in a penetration part 11 formed in a wooden building and functions as a firestop layer, and cover the penetration part 11 for fireproof easily and at low cost.

That is, according to the present embodiment, the penetration part fireproof covering material 10 is formed to have a tubular shape by stacking a plurality of annular gypsum board pieces 13a in the thickness direction and unitarily connecting the gypsum board pieces 13a. Accordingly, the penetration part fireproof covering material 10 can be formed accurately and economically by preferably accurately cutting a plurality of annular gypsum board pieces 13a from commercially available inexpensive gypsum boards 13 with thicknesses of 9.5 mm to 25.5 mm, without making a tubular molding mold each time, and stacking the plurality of annular gypsum board pieces 13a. At the same time, the penetration part 11 can be covered for fireproof easily and at low cost with a simple operation of installing the formed penetration part fireproof covering material 10 in the penetration part 11 and fixing the formed penetration part fireproof covering material 10 to the penetration part 11.

Also, in the present embodiment, the penetration part fireproof covering material 10 is preferably formed by fixedly stacking a plurality of annular gypsum board pieces 13a and unitarily connecting the gypsum board pieces 13a, and attached to the penetration part 11 such that two connecting portions 15 out of the connecting portions 15 that connect the annular gypsum board pieces 13a that are adjacent in the stacking direction are disposed at two boundary portions 23 between the structural member 21 and the covering members 22 of the fireproof beam 20, or at portions close to the boundary portions 23. With this configuration, for example, even if height differences are generated at the boundary portions 23 in the penetration part 11 due to differences in behavior caused when the structural member 21 and the covering members 22 dry and contract, and differences in behavior when they support a load, the generated height differences are absorbed because adjacent annular gypsum board pieces 13a are displaced on both sides of the connecting portions 15 provided at the boundary portions 23 or portions close to the boundary portions 23, and it is therefore possible to effectively avoid a situation in which the penetration part fireproof covering material 10 is likely to crack and the function as a firestop layer is likely to be lost.

Figure 5:
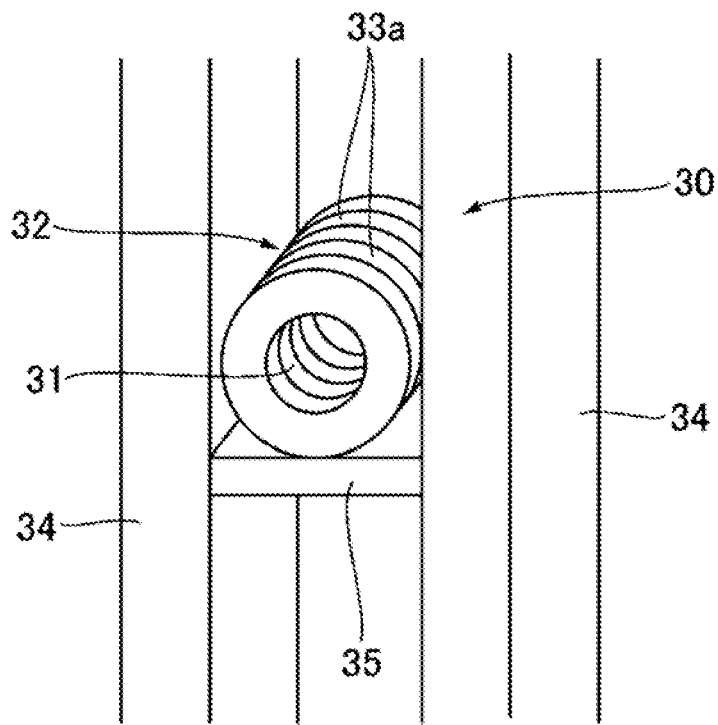
FIG. 5 is a schematic perspective view showing an example of a state in which a penetration part covered for fireproof by a penetration part fireproof covering material is formed in a wall portion that is a fire prevention section forming member.
Figure 6A:
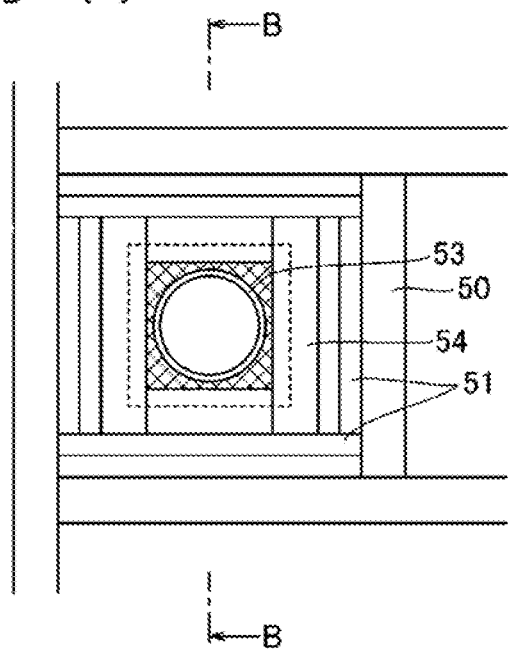
FIG. 6 shows an example of a conventional structure for forming a penetration part in a fire prevention section forming member, with FIG. 6(a) being a schematic cross sectional view taken along the line C-C shown in FIG. 6(b), and FIG. 6(b) being a schematic cross sectional view taken along the line B-B shown in FIG. 6(a).
Figure 6B:
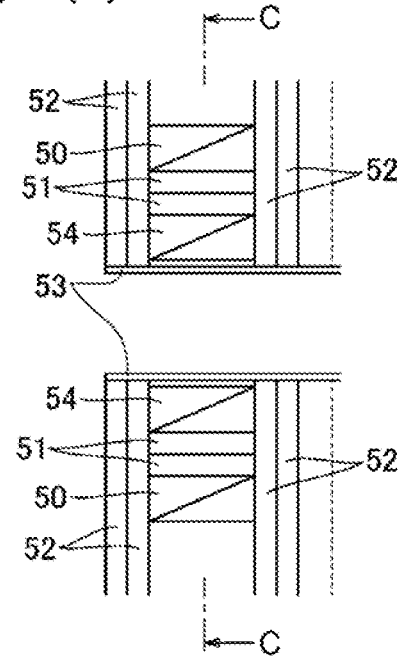

FIG. 5 shows an embodiment in which a penetration part fireproof covering material 30 that has the same configuration as described above is used when a penetration part 31 covered and made fireproof is formed in, for example, a fireproof wall that is a fire prevention section forming member for forming a fire prevention section in a wooden building. That is, in the embodiment shown in FIG. 5 in which the penetration part 31 is formed in the fireproof wall, the penetration part fireproof covering material 30 that preferably has a cylindrical shape and is formed by stacking, as gypsum board pieces, a plurality of ring-shaped annular gypsum board pieces 33a formed from gypsum boards preferably of thicknesses of 9.5 mm to 25.5 mm and unitarily connecting the gypsum board pieces 33a is placed on and fixed to a support table 35 that is attached by being supported by posts or studs 34 that constitute the fireproof wall, and the penetration part 31 of the penetration part fireproof covering material 30 is formed extending through the fireproof wall. Also, the penetration part fireproof covering material 30 covers the inner circumferential surface of the penetration part 31, and the penetration part fireproof covering material 30 is attached to the penetration part 31.

In the embodiment shown in FIG. 5 in which the penetration part 31 is formed in the fireproof wall, after the penetration part fireproof covering material 30 is attached, known wall surface materials having predetermined fireproof are attached to the front and back sides of the fireproof wall by being supported by the posts or studs 34. In this way, a fireproof wall is formed in which the penetration part 31 of the penetration part fireproof covering material 30 is provided.

Even in the embodiment shown in FIG. 5 in which the penetration part 31 is formed in the fireproof wall, the penetration part fireproof covering material 30 that forms the penetration part 31 is formed to have a tubular shape by stacking a plurality of annular gypsum board pieces 33a formed from gypsum boards of thicknesses of 9.5 mm to 25.5 mm, in the thickness direction and unitarily connecting the gypsum board pieces 33a. Accordingly, advantageous effects that are the same those of the fireproof penetration part covering structure 10 of the above-described embodiment can be obtained.

The present invention is not limited to the embodiment described above, and various modifications can be made. For example, the gypsum board pieces are not necessarily ring-shaped annular gypsum board pieces, and may be annular gypsum board pieces of any other shape or gypsum board pieces that can be connected to form an annular shape. The penetration part fireproof covering material is not necessarily a cylindrical fireproof covering material, and may be a tubular fireproof covering material of any other shape such as a rectangular cylindrical shape. The fireproof constructional member in which a penetration part is formed is not necessarily a fireproof beam that includes a structural member that serves as a load supporting layer and a pair of covering members that serve as burning margin layers, and may be a fireproof beam that includes a structural member that serves as a load supporting layer and a burning margin layer or a firestop layer disposed to cover the surface of the structural member, or a covering member including a burning margin layer and a firestop layer disposed to cover the surface of the structural member, or may be any other fireproof constructional member that constitutes a wooden building such as a fireproof post.

INDUSTRIAL APPLICABILITY

With the penetration part fireproof covering material according to the present invention, it is possible to accurately and economically form a fireproof covering material that is installed in a penetration part in a wooden building and functions as a firestop layer, and cover the penetration part for fireproof easily and at low cost.

The invention claimed is:

1. A penetration part fireproof covering material used when a penetration part covered for fireproofing is formed in a wooden building, wherein the fireproof covering material is formed to have a tubular shape by stacking a plurality of gypsum board pieces in a thickness direction and unitarily connecting the plurality of gypsum board pieces.

2. The penetration part fireproof covering material according to claim 1, wherein the plurality of gypsum board pieces are annular gypsum board pieces.

3. The penetration part fireproof covering material according to claim 2, wherein the plurality of gypsum board pieces are cut out from gypsum boards of thicknesses of 9.5 mm to 25.5 mm.

4. The penetration part fireproof covering material according to claim 3, wherein the plurality of gypsum board pieces are stacked and unitarily connected in such a manner that sheets of paper are attached to both sides of each gypsum board piece.

5. The penetration part fireproof covering material according to claim 4, wherein the plurality of gypsum board pieces are stacked and unitarily connected to form the tubular shape by being fixed to each other using metal fasteners.

6. The penetration part fireproof covering material according to claim 5, wherein the plurality of gypsum board pieces are ring-shaped gypsum board pieces and are stacked and unitarily connected to form a cylindrical shape.

7. The penetration part fireproof covering material according to claim 4, wherein the plurality of gypsum board pieces are ring-shaped gypsum board pieces and are stacked and unitarily connected to form a cylindrical shape.

8. The penetration part fireproof covering material according to claim 3, wherein the plurality of gypsum board pieces are stacked and unitarily connected to form the tubular shape by being fixed to each other using metal fasteners.

9. The penetration part fireproof covering material according to claim 8, wherein the plurality of gypsum board pieces are ring-shaped gypsum board pieces and are stacked and unitarily connected to form a cylindrical shape.

10. The penetration part fireproof covering material according to claim 3, wherein the plurality of gypsum board pieces are ring-shaped gypsum board pieces and are stacked and unitarily connected to form a cylindrical shape.

11. The penetration part fireproof covering material according to claim 2, wherein the plurality of gypsum board pieces are stacked and unitarily connected to form the tubular shape by being fixed to each other using metal fasteners.

12. The penetration part fireproof covering material according to claim 11, wherein the plurality of gypsum board pieces are ring-shaped gypsum board pieces and are stacked and unitarily connected to form a cylindrical shape.

13. The penetration part fireproof covering material according to claim 2, wherein the plurality of gypsum board pieces are ring-shaped gypsum board pieces and are stacked and unitarily connected to form a cylindrical shape.

14. The penetration part fireproof covering material according to claim 1, wherein the plurality of gypsum board pieces are cut out from gypsum boards of thicknesses of 9.5 mm to 25.5 mm.

15. The penetration part fireproof covering material according to claim 14, wherein the plurality of gypsum board pieces are stacked and unitarily connected in such a manner that sheets of paper are attached to both sides of each gypsum board piece.

16. The penetration part fireproof covering material according to claim 1, wherein the plurality of gypsum board pieces are stacked and unitarily connected to form the tubular shape by being fixed to each other using metal fasteners.

17. The penetration part fireproof covering material according to claim 16, wherein the plurality of gypsum board pieces are ring-shaped gypsum board pieces and are stacked and unitarily connected to form a cylindrical shape.

18. The penetration part fireproof covering material according to claim 1, wherein the plurality of gypsum board pieces are ring-shaped gypsum board pieces and are stacked and unitarily connected to form a cylindrical shape.

\* \* \* \* \*